United States Patent
Layman

(10) Patent No.: US 7,085,868 B2
(45) Date of Patent: Aug. 1, 2006

(54) METHOD TO MINIMIZE INTERRUPT SERVICE AND POWER CONSUMPTION FOR WIRELESS CONNECTIVITY DEVICES

(75) Inventor: David K. Layman, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 09/968,107

(22) Filed: Sep. 28, 2001

(65) Prior Publication Data

US 2003/0065851 A1 Apr. 3, 2003

(51) Int. Cl.
*G06F 13/14* (2006.01)

(52) U.S. Cl. ......................... 710/240; 340/5.2; 340/7.21

(58) Field of Classification Search ................ 370/328, 370/338, 400–401; 340/5.2–5.27, 7.2–7.4; 455/466; 709/206, 220–228; 710/260, 240, 710/241, 316
See application file for complete search history.

(56) References Cited

U.S. PATENT DOCUMENTS

| | | | |
|---|---|---|---|
| 6,029,195 A | | 2/2000 | Herz |
| 2002/0035699 A1 | * | 3/2002 | Crosbie .................... 713/201 |
| 2002/0069278 A1 | | 6/2002 | Forslöw |
| 2002/0174073 A1 | * | 11/2002 | Nordman et al. ............. 705/64 |
| 2002/0174224 A1 | * | 11/2002 | Scheifler et al. ............ 709/225 |
| 2003/0095524 A1 | * | 5/2003 | Stephens et al. ........... 370/338 |

FOREIGN PATENT DOCUMENTS

| | | |
|---|---|---|
| EP | 1 024 628 A1 | 8/2000 |
| WO | WO 00/77619 A2 | 12/2000 |
| WO | WO 02/093290 A2 | 11/2002 |

OTHER PUBLICATIONS

Specification of the Bluetooth System, vol. 2: Profiles, v1.0B, http://www.bluetooth.com, Dec. 1, 1999, pp. 79–81.*
Specification of the Bluetooth System, vol. 1: Core, v1.0B, http://www.bluetooth.com, Dec. 1, 1999, pp. 344–357.*
Provisional U.S. Appl. No. 60/311,716, Stephens et al.*
Provisional U.S. Appl. No. 60/220,385, Crosbie.*
PCT Search Report, Int'l application # PCT/US02/27893, mailing date Feb. 14, 2003, 5 pages.

* cited by examiner

Primary Examiner—Mark H. Rinehart
Assistant Examiner—Clifford Knoll
(74) Attorney, Agent, or Firm—Cindy T. Faatz

(57) ABSTRACT

A method for filtering requests in portable devices is described. Nonvolatile flash memory is used to store allowable client addresses. The discovery, service discovery, and connection filter algorithms reduces power and processing bandwidth required from portable, mobile devices.

22 Claims, 4 Drawing Sheets

METHOD TO MINIMIZE INTERRUPT SERVICE AND POWER CONSUMPTION FOR WIRELESS CONNECTIVITY DEVICES

FIELD OF THE INVENTION

The present invention pertains to wireless communication devices. More particularly, the present invention relates to a method to minimize interrupt service and power consumption for wireless connectivity devices based on device address and service endpoint filtering.

BACKGROUND OF THE INVENTION

Wireless communication devices that are designed for mobile applications are typically implemented as short-range, short-lived connections. To establish connection, wireless devices utilize a protocol that includes discovery, service query, connection request, connection response, and connection. In addition, some protocols include a security phase, in which an authentication algorithm is used to verify the validity of the requesting device.

Discovery is the process of determining which devices are currently within range. Typically, the initiator of the discovery exchanges device addresses and other information with the responder.

A portable device can potentially encounter several devices which roam in and out of range. A device in search of services is often called a client. A device that offers the services is known as a server. Clients in constant search of a new domain will periodically discover what devices are in range. Examples of server devices include internet gateways, vending machines, printers, and other public service machines.

When new devices are found, a portable roaming device will perform a service query to ascertain what services are available on the new devices. The service query involves establishing a connection to the new device at a well known service access point and exchanging database queries and responses in a format appropriate for the protocol. The response to a discovery, the negotiation of a connection to the service database, and the exchange of information all require bandwidth.

Further, the responding device uses bandwidth in executing the protocol, searching its database, and formatting a response. One disadvantage of the prior art is that as personal information devices proliferate, and contain more and more ad-hoc wireless protocols, the possibility that hundreds of devices come into range, and each device must query all of the others, and collect service information, is high. As a result, an enormous amount of bandwidth will be required to execute the protocol, search the database, and format a response for each and every request.

In addition, power is consumed in sending responses. Wireless communication devices mostly communicate either through radio or optical links. Radio links typically use a baseband protocol engine and a radio transceiver. One example of a radio link is Bluetooth.

In contrast, optical links are usually achieved through infrared light. The Infra-red Data Association (IrDA) has a defined standard for linking two devices at any data rate up to the current maximum data rate of 4 Mbps. The power required to transfer either radio frequency energy or infrared energy is considerable. Therefore, responding to hundreds of service requests will also greatly reduce the battery life of devices.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of storing selected addresses as an authorized list of "friendly devices" is described. The devices of the authorized list are granted various levels of permission to discover, to view the services database, and to connect to a service endpoint through the use of filtering algorithms. The authorized list helps to minimize the use of bandwidth and reduce power consumption.

Figure 1:
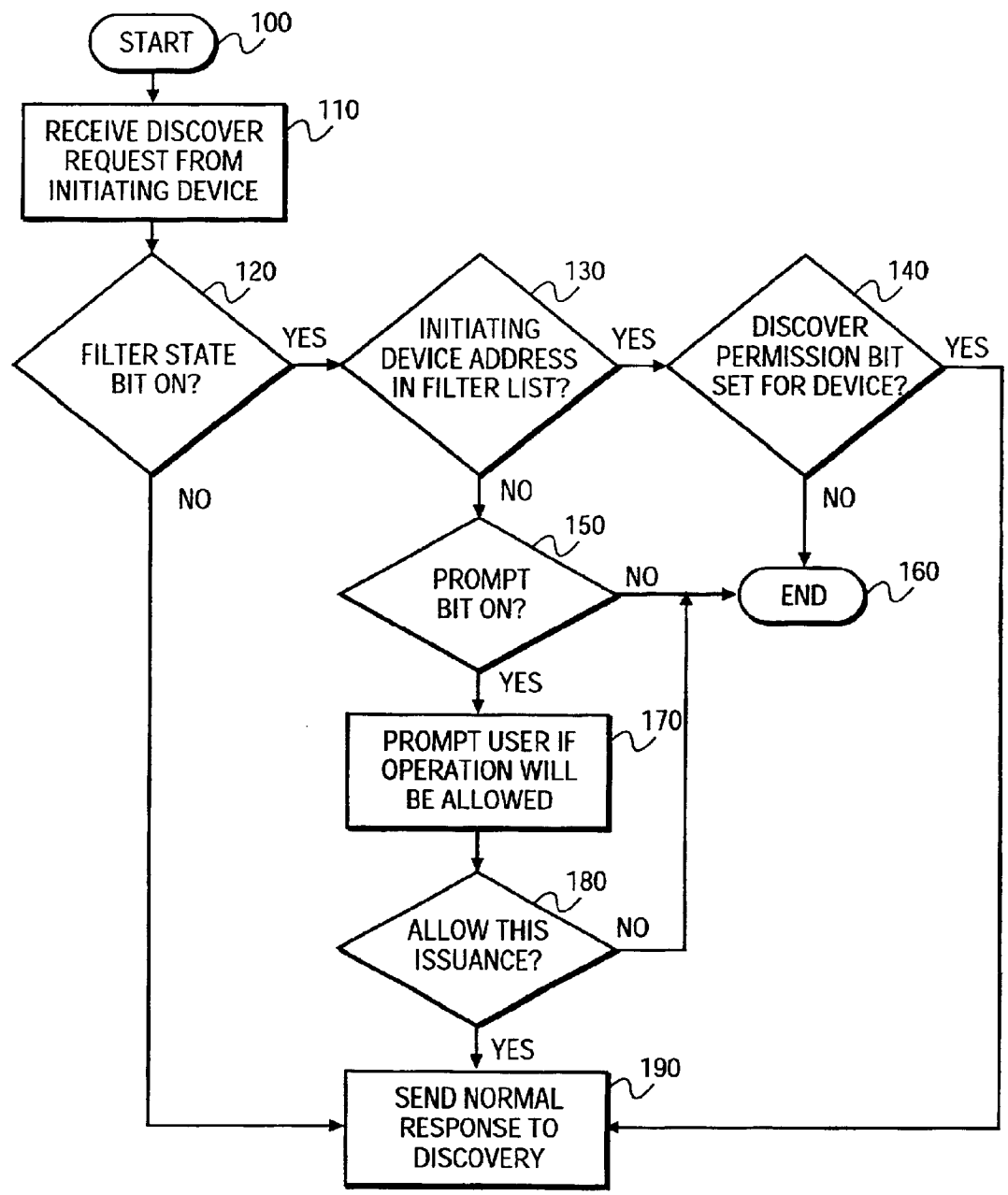
FIG. 1 shows a flowchart of one embodiment of a discovery filter algorithm.

FIG. 1 depicts an embodiment of a discovery filter algorithm. The algorithm is designed to filter out inquiries from unsupported client or server devices at the hardware, baseband controller, or communications processor engine level. The algorithm is initiated in operation 100 when one device makes a discovery inquiry with another device. Typically, the requesting device is the client device and the responding device is the server device. The requesting device, however, is not necessarily the client device and the responding device is not necessarily the server device. For example, a printer may actively seek to discover potential roaming devices to service. Even though the printer is the initiating device, the printer is a server device rather than a client device. The discovery algorithm does not change regardless of whether the initiating device is a server device or a client device. The discovery algorithm is available for use in both client and server devices.

For one embodiment of the discovery filter algorithm of FIG. 1, the initiating device is the client device and the responding device is the server device. After receiving the discovery request from the client device in operation 110, the algorithm of operation 120 determines whether the device is set to filter mode. The filter state bit is set by the user application stored in nonvolatile flash memory. If the filter state bit is not on, the algorithm of operation 190 sends the normal discovery response to the requesting device. If, however, the filter state bit is asserted, operation 130 determines if the client device address is in the filter list. The device addresses of approved or friendly devices are stored in a cache of non-volatile flash memory in this embodiment of the invention.

If the address of the client device is found in the filter list in operation 130, the algorithm determines whether the permission bit is set for the device in operation 140. The server device will not approve the discovery request unless the client device is on the filter list. If the device is on the list, the permission bits are stored in the non-volatile memory array.

If the discovery permission bit for the client device in operation 140 is not set, the client device is denied inquiry permission and the algorithm is terminated by operation 160. Otherwise, if the discovery permission bit for the client device is set, then the server device sends the normal discovery response to the client device in operation 190.

If the server device does not find the address of the client address in the filter list in operation 130, the algorithm in operation 150 determines whether the prompt state bit is asserted. The prompt state bit gives the user the option of being notified of discovery attempts. If the prompt state bit is not asserted, the client device is denied inquiry permission and the algorithm is terminated in operation 160.

If the prompt state bit is to be asserted, the user is given the option of deciding whether to allow the discovery operation in operation 170. Like the discover filter list, the prompt state bit is set by the user application in the nonvolatile flash memory. In the event that the user does not allow the discovery operation, the client device is denied inquiry permission and the algorithm is terminated in operation 160. Otherwise, the user allows the discovery operation and the server device sends the normal response to the discovery request in operation 190.

For a second embodiment of the discovery algorithm, the user is not given the option of allowing the inquiry attempt in operation 180. In some protocols, the time span for the discovery process is too short for a user to reasonably respond to the prompt before the discovery process has ended. Therefore, the client device is denied the discovery request and the flow is the same as if a 'no' response had been received from the user.

For a third embodiment of the discovery algorithm, the client device address is added to the filter list in the nonvolatile flash memory. The addition can be made either automatically or following the user's approval. The device address would then be available to the client device should the client device subsequently request a service discovery.

The discovery algorithm can be implemented in either hardware or software. If a hardware design is chosen, the filter mechanism is implemented in the baseband protocol engine. If, however, a software design is chosen, the filter mechanism is implemented in the upper layer host stack. It is also possible for the algorithm to be implemented using both hardware and software at the same time.

Figure 2:
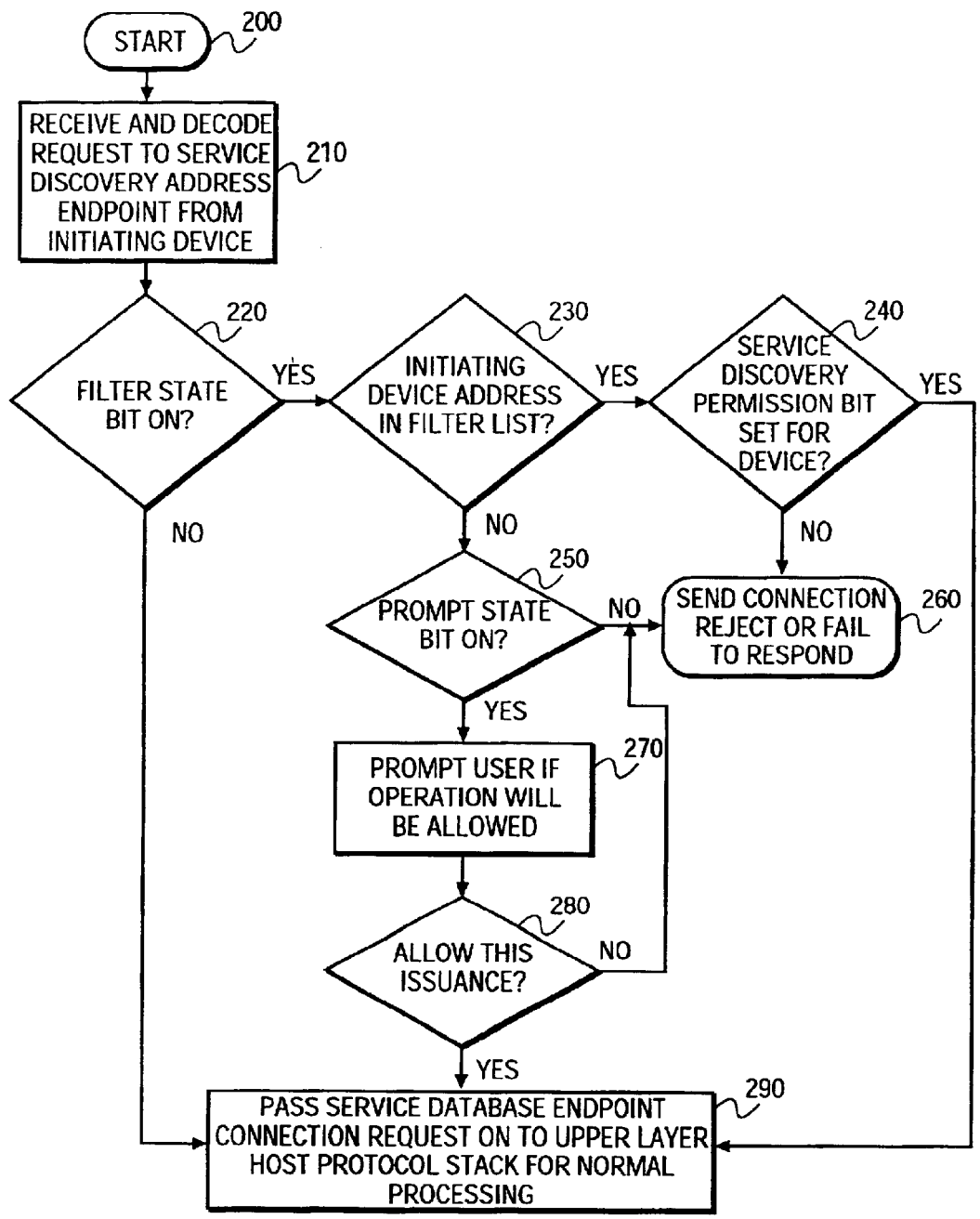
FIG. 2 shows a flowchart of one embodiment of a service discovery filter algorithm.

If the client device successfully discovers the address of the server device, the client device will next attempt to determine what services are available on the server device. FIG. 2 depicts an embodiment of a service discovery filter algorithm. In one example of FIG. 2, the client device is the initiating device and the server device is the responding device. The roaming client device is typically searching for public services such as internet gateways and printers.

When the service discovery filter algorithm is initiated in operation 200, a connection at the first layer of the protocol that supports service endpoints between two hosts is opened if software is used to implement the service discovery algorithm. If a hardware design is chosen instead, a state machine in a baseband processor will carry out the service discovery algorithm. The server device receives and decodes the client device's request to the service discovery address endpoint in operation 210. A specific endpoint address is usually reserved for the service discovery traffic.

In a software design of the service discovery filter algorithm, all implementations of the stack typically involve the same layers of the stack from the multiplexer layer on down. Because there are no other paths to top level services of the stack between the physical layer and the multiplexer layer that supports multiple endpoints, stack hardware or firmware engines can safely assume that all data traffic will have at least the headers necessary for layers up to the multiplexer layer. Therefore, filter engines, such as baseband processors, can pre-extract requests for connection to the service database server by looking at the endpoint address requested. The filter algorithm can be built into the host protocol stack at the multiplexer layer if the implementation of the device does not have baseband processing on the device hardware.

A connection request for most protocols includes the device address of the device requesting the connection. Thus, in operation 230, it is possible to filter service discovery requests by the requesting client device providing that the filter state bit is on in operation 220. If the filter state bit is not on, then the service database endpoint connection request is passed on to the upper layer host protocol stack for normal processing in operation 290. The filter state bit is stored in nonvolatile flash memory.

If the filter state bit is on, the service discovery filter algorithm checks if the initiating client device address is in the filter list. If the device is not on the approved client list, the algorithm checks if the prompt state bit is on in operation 250. The prompt state bit is typically stored in nonvolatile flash memory. If the prompt state bit is deasserted, operation 260 permits the connection to be rejected or the server device may choose to not respond at all. Otherwise, if the prompt state bit is asserted, the user is prompted to decide whether the request operation will be allowed in operation 270. If the request is not allowed, in operation 260, the server can either refuse to respond to the request or send a rejection for the connection request. If, however, the request is allowed, the service database endpoint connection request is passed on to the upper layer host protocol stack for normal processing in operation 290.

If in operation 230, the requesting device is found in the filter list, then the algorithm of operation 240 determines whether the service discovery permission bit is set in the device. The permission bit is stored in nonvolatile memory along with the allowed or friendly device address. If the discovery permission bit is set in the server device, then the service database endpoint connection request is passed on to the upper layer host protocol stack for normal processing in operation 290. If, however, the service discovery permission bit is not set in the server device, then the connection is rejected in operation 260. The server device may choose to send a rejection to the client device or the server device may choose not to respond. Failing to respond will save power on the server device. However, failing to respond will leave the client device hanging until the request times out.

For a second embodiment of the service discovery filter algorithm, the client device address is added to the approval list with an expiration time after the owner of the device is prompted for approval in operation 270. It is possible that following the service discovery, a service endpoint for a particular service will be requested.

Figure 3:
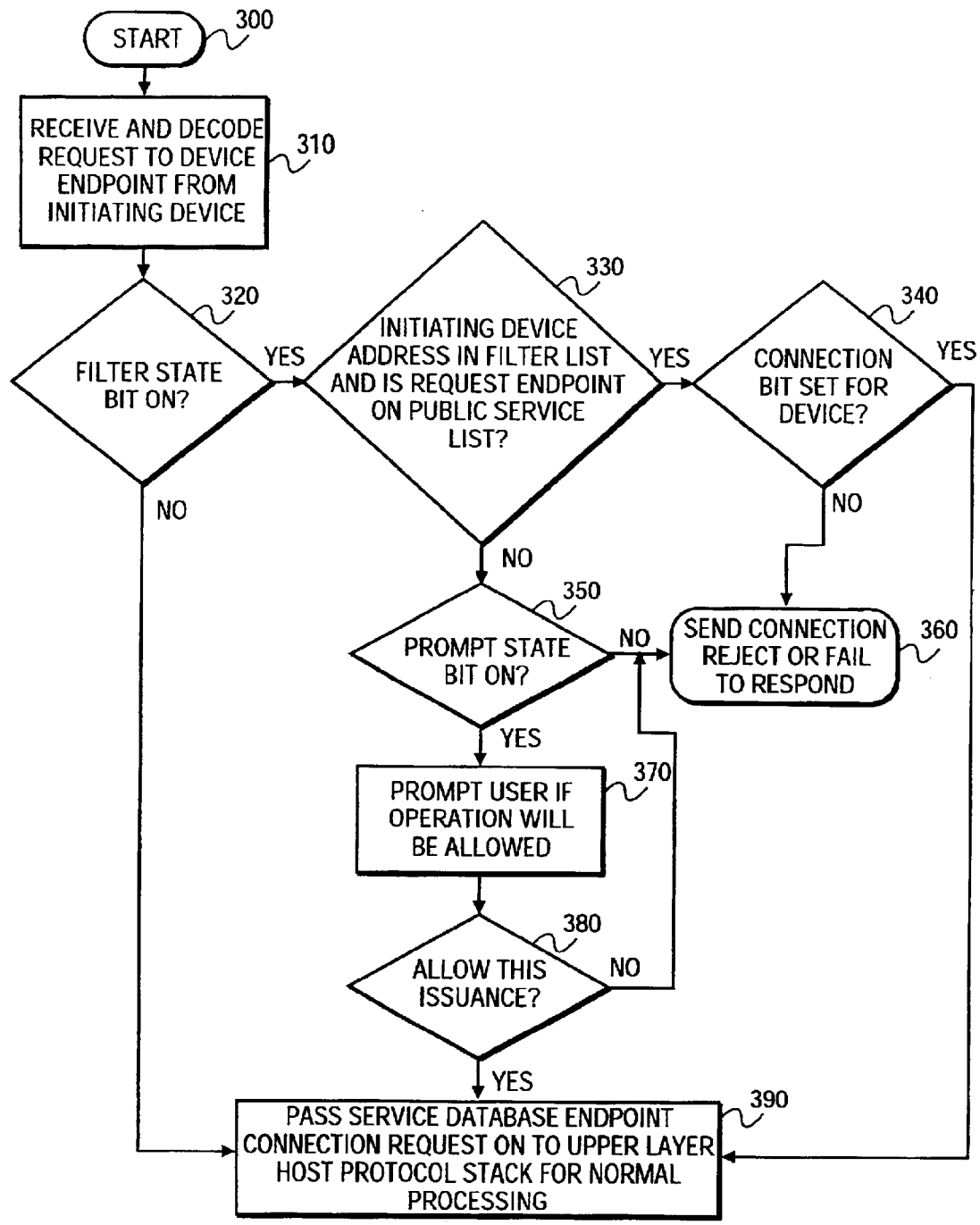
FIG. 3 shows a flowchart of one embodiment of a connection filter algorithm.

If the roaming client device has been permitted to discover and connect to the server device's database, the roaming client device might want to connect to a service endpoint discovered during the services query from the database. Some services available on a device may be exposed to the public, however, and some other services may be kept private. The set of services exposed to the public is defined as a public service list. The connection filter algorithm shown in FIG. 3 determines whether to allow or disallow the connection. Like the discovery filter algorithm and the service discovery filter algorithm, the filter algorithm for the connection filter algorithm can exist either in the baseband protocol engine, which is likely part of the protocol device or in the upper layer host stack. The baseband protocol engine is often used because it saves bandwidth of the host processor by not needlessly interrupting the host processor. Regardless of whether the filter algorithm is stored in the baseband protocol engine or in the upper layer host stack, power is saved if the filter algorithm chooses not to respond to the request after filtering out the request.

Once the connection filter algorithm is initiated in operation 300, the connection request to the device endpoint is received and decoded in operation 310. Next, the algorithm determines whether the filter state bit is on in operation 320. The filter state bit is stored in nonvolatile flash memory. If the filter state bit is not on, the filter is bypassed and the service database endpoint connection request is passed on to the upper layer host protocol stack for normal processing in operation 390.

If the filter state bit is on, however, the connection filter algorithm determines if the initiating device address is in the filter list and if the request endpoint is on the public service list. If the initiating device address is in the filter list and the request endpoint is on the public service list, the connection filter algorithm determines whether the connection bit is set for the device in operation 340. If the connection bit is set for the device, then the service database endpoint connection request is passed to the upper layer host protocol stack for normal processing in operation 390. Otherwise, if the connection bit of the device is not set, the connection in operation 360 is rejected or fails to respond. Failing to respond will save power for the server device. The initiating device will time out when it does not receive the requested connection.

If the initiating device address is not in the filter list or the request endpoint is not on the public service list, then the connection filter algorithm checks if the prompt state bit is on in operation 350. The prompt state bit is typically stored in nonvolatile flash memory. If the prompt state bit is not on, the connection in operation 360 is either rejected or the server fails to respond. If the prompt state bit is on, the user is prompted to decide if the operation will be allowed in operation 370. If the user allows the issuance in operation 380, the service database endpoint connection request is passed on to the upper layer host protocol stack for normal processing in operation 390. If, however, the user does not allow the issuance in operation 380, the connection is either rejected of the server fails to respond in operation 360.

Some server and client devices may not offer services of general interest to roaming devices. It is desirable, however, for all devices to make services available to any device in a specific instance, such as exchanging business card information. As personal information devices proliferate, and contain more and more wireless protocols, there is a high probability that a large number of devices will come into range of each other. When the devices come into range of each other, the devices are likely to query each other to collect service information. This will be an order of n squared where n is the number of devices. The queries will take up bandwidth and consume power. Therefore, the ability to limit the ability of a random client to discover, view the services database, and connect to a service endpoint becomes even more valuable. Some processing power is still expended in order to filter the requests. Nevertheless, checking an authorized list of devices and avoiding unnecessary responses will require less power than to execute protocol and form a response every time.

Embodiments of the present invention may be implemented in hardware or software, or a combination of both. However, preferably, embodiments of the invention may be implemented in computer programs executing on programmable computer systems each comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion.

Each program may be implemented in a high level procedural or object oriented programming language to communicate with the computer system. However, the programs may be implemented in assembly or machine language, if desired. In any case, the language may be a compiled or interpreted language.

Each such computer program may be stored on a storage media or device (e.g., hard disk drive, floppy disk drive, read only memory (ROM), CD-ROM device, flash memory device, digital versatile disk (DVD), or other storage device) readable by a general or special purpose programmable computer system, for configuring and operating the computer system when the storage media or device is read by the computer system to perform the procedures described herein. Embodiments of the invention may also be considered to be implemented as a machine-readable storage medium, configured for use with a computer system, where the storage medium so configured causes the computer system to operate in a specific and predefined manner to perform the functions described herein.

Figure 4:
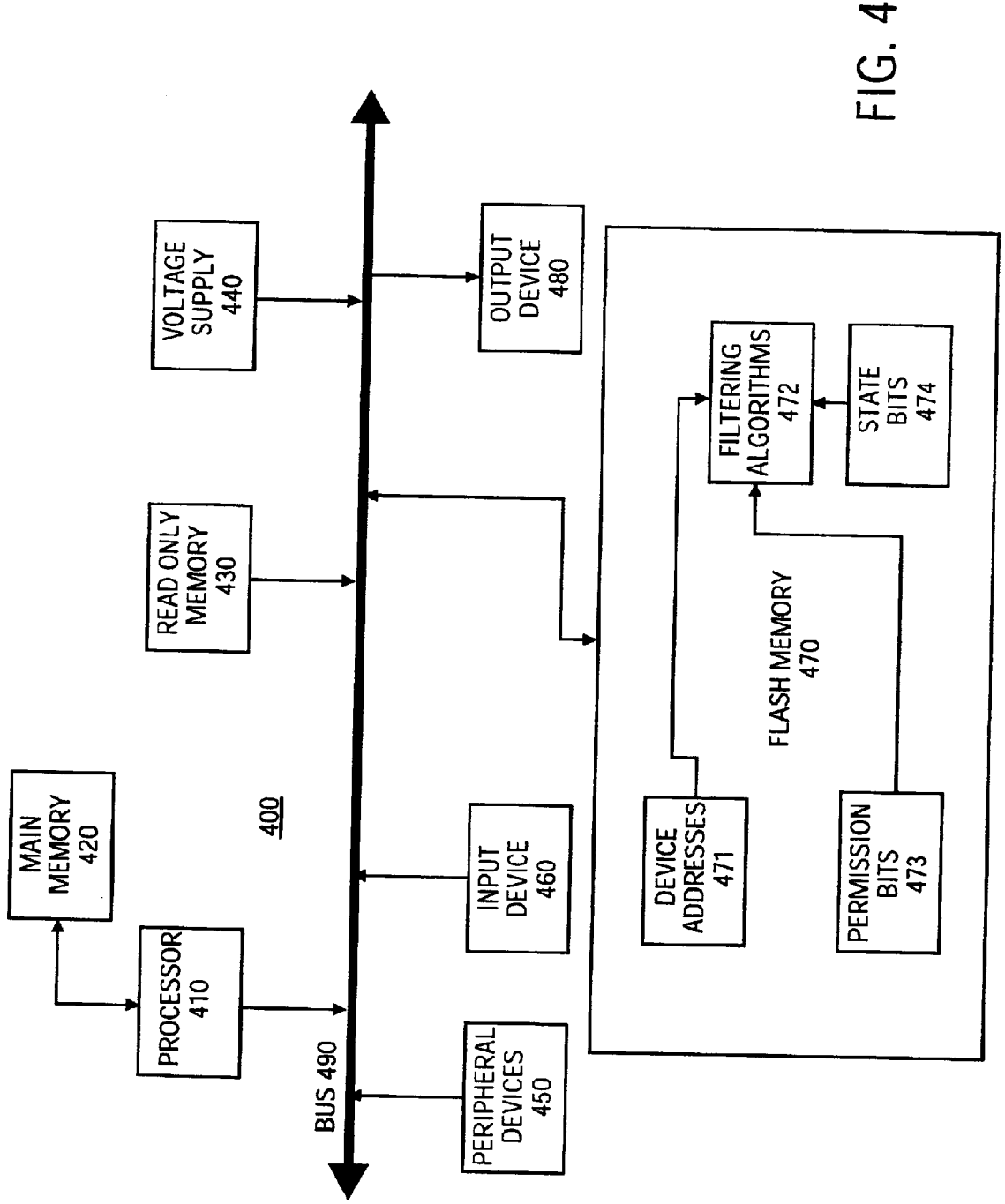
FIG. 4 shows a wireless communication system.

An example of one such type of computer system is shown in FIG. 4. The components of a wireless communication computer system 400 includes a processor 410, main memory 420, read only memory 430, voltage supply 440, peripheral devices 450, input device 460, flash memory 470, output device 480, and bus 490. The processor 410 is coupled to main memory 420 and the system bus 490. In addition, the system bus is also coupled to read only memory 430, a voltage supply 440, peripheral devices 450, an input device 460, flash memory 470, and an output device 480. Wireless communication devices often utilize a battery to provide the voltage supply 440. An example of a peripheral device 450 would be a baseband controller. The input 460 and output 480 devices enable the user to make operation requests and to respond to system queries. Finally, the flash memory 470 stores information such as device addresses 471, filtering algorithms 472, permission bits 473, and state bits 474.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A method of filtering a device request, comprising:
   receiving an inquiry on a first device;
   running a discovery filter algorithm on a broadband processor to filter out inquiries from unsupported devices;
   if a filter mode is set, responding to the inquiry only if the inquiry is from a supported device;
   running a service availability algorithm on the broadband processor to determine services available on the first device; and running a connection filter algorithm on the broadband processor to determine whether to grant access to a service endpoint.

2. The method of claim 1, wherein the inquiry is initiated by a second device.

3. The method of claim 2, wherein an approved list is used to determine if the second device is a supported device.

4. The method of claim 2, wherein the filter mode is defined by a state bit stored in a memory.

5. The method of claim 4, wherein the memory is a nonvolatile memory.

6. The method of claim 5, wherein the nonvolatile memory is a flash electrically programmable erasable read only memory (EEPROM) array.

7. The method of claim 3, wherein a user of the first device is prompted to decide if the inquiry will be allowed if the second device is not on the approved list.

8. The method of claim 2, wherein the service availability algorithm filters connection requests to a service discovery database.

9. The method of claim 1, wherein the service availability algorithm comprises determining if the first device provides an internet gateway.

10. The method of claim 8, wherein the service availability algorithm refuses connection to the service discovery database if the second device is not on an approved permissions list.

11. The method of claim 2, wherein the connection filter algorithm is implemented in software.

12. A system comprising:

a bus:

a central processing unit (CPU), wherein the CPU is coupled to the bus;

a nonvolatile memory array to store a plurality of device addresses used to filter, wherein the nonvolatile memory array is coupled to the bus;

a baseband processor coupled to the bus, wherein the baseband processor comprises a plurality of filtering algorithms, wherein the baseband processor executes the plurality of filtering algorithms, at least one of the filtering algorithms to access the nonvolatile memory array to determine whether an address associated with an inquiring device is stored in the nonvolatile memory array, wherein, if a filter mode is set, the baseband processor is to resound to the inquiring device only if the address associated with the inquiring device is stored in the non-volatile memory; and a user interface, wherein the user interface is coupled to the bus.

13. The system of claim 12, wherein the nonvolatile memory array contains software code that implements the plurality of filtering algorithms.

14. The system of claim 12, wherein the nonvolatile memory array is used to store a plurality of permission bits.

15. The system of claim 12, wherein the plurality of permission bits compromise:

a discovery permission bit;

a service, query permission bit; and a connect permission bit.

16. The system of claim 12, wherein the nonvolatile memory array is a flash electrically programmable erasable read only memory (EEPROM) array.

17. The system of claim 12, wherein the plurality of filter algorithms comprise:

a discovery filter algorithm;

a service database query filter algorithm; and a connection filter algorithm.

18. An apparatus comprising:

means for receiving a discovery request from a device;

means filtering a plurality of inquiries from the device, if a filter mode is set, the means for filtering to cause a response to be provided to the device only if the device is determined to be an approved device;

means for receiving a plurality of service queries;

means for decoding a plurality of service queries; and means for filtering a plurality of service queries.

19. The apparatus of claim 18 further comprising a means for filtering a plurality of connection requests to a discovered service endpoint.

20. A method comprising:

receiving a request to a service directory address endpoint from an initiating device;

decoding the request;

searching for the initiating device in a filter list if a filter state bit is on;

if the filter state bit is on, responding to the initiating device only if the initiating device is in the filter list; and passing the request to an upper layer host protocol stack for processing if a service discovery permission bit is set.

21. The method of claim 20, further comprising determining if a prompt state bit is on if the initiating device is not found in the filter list.

22. The method of claim 21, further comprising prompting a user for permission to allow service discovery if the prompt state bit is on.

* * * * *